Feb. 15, 1966    J. N. YOUNG    3,234,822
HYDRAULICALLY CONTROLLED POSITIVE
INFINITELY VARIABLE TRANSMISSION
Filed July 29, 1963    3 Sheets-Sheet 2
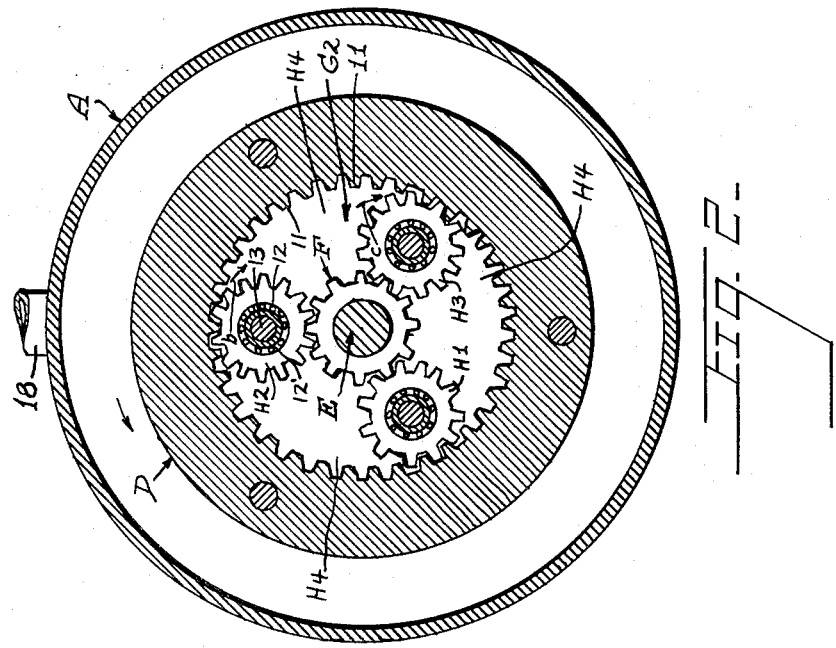
_FIG. 2_
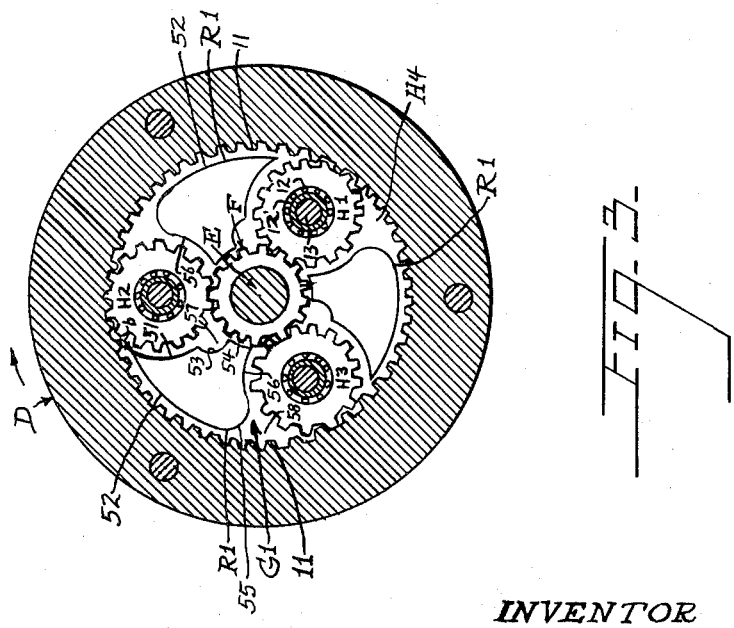
_FIG. 3_
INVENTOR
JAY N. YOUNG
BY William R. Piper
ATTORNEY

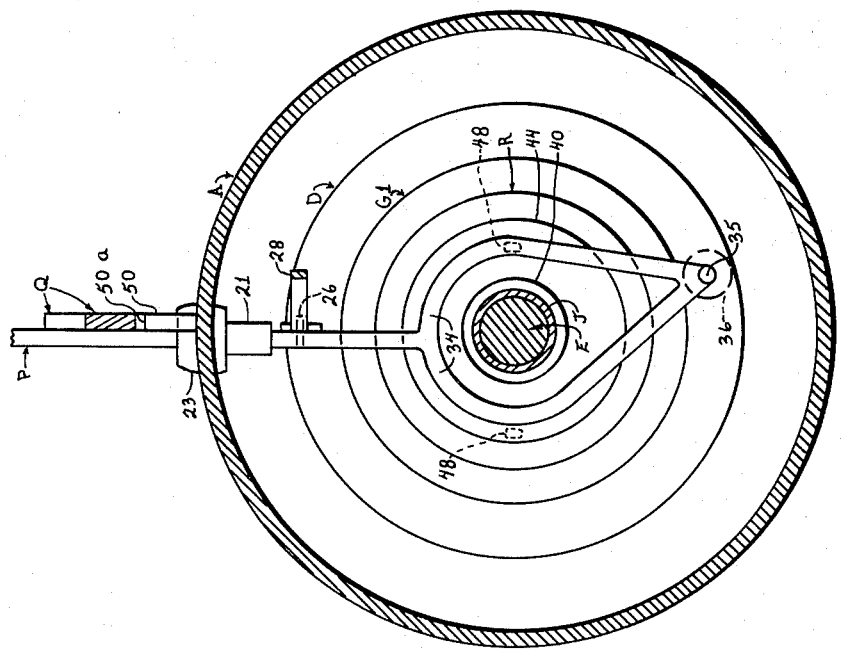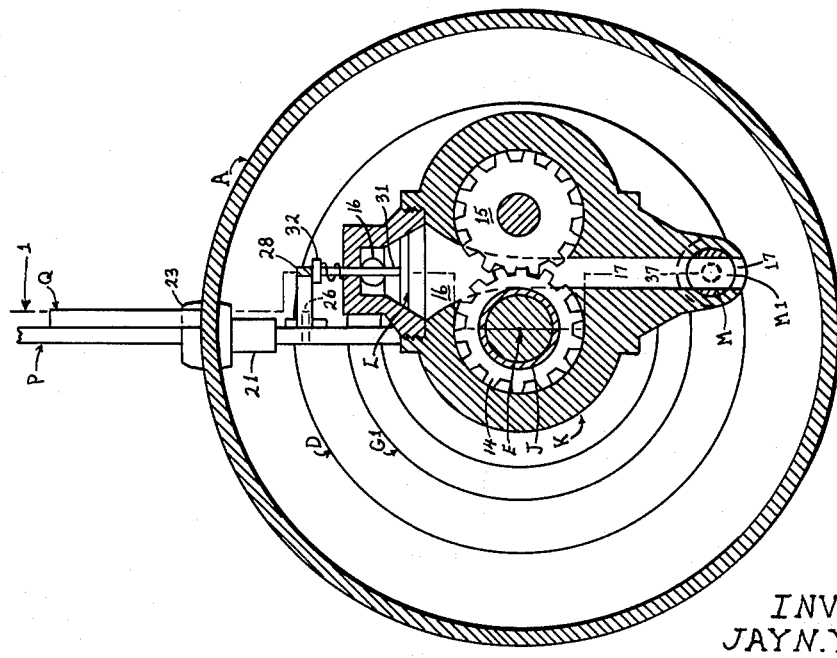

United States Patent Office 3,234,822
Patented Feb. 15, 1966

3,234,822
HYDRAULICALLY CONTROLLED POSITIVE
INFINITELY VARIABLE TRANSMISSION
Jay N. Young, 3400 N. Herrod Road, Atwater, Calif.
Filed July 29, 1963, Ser. No. 298,265
7 Claims. (Cl. 74—791)

The present invention relates to improvements in a hydraulically controlled positive infinitely variable transmission and it consists in the combinations, constructions and arrangement of parts hereinafter described and claimed.

An object of my invention is to provide a hydraulically controlled positive infinitely variable transmission in which the power input shaft is operatively connected to the output shaft by a planetary gearing that is immersed in oil. An oil pump brake is controlled by the operator to apply an infinitely variable braking action to the housing plates that rotatably carry the planetary pinions. The braking action can be increased up to the point where the housing plates are held from rotating and the ring gear which is rotated by the input shaft will directly rotate the sun gear and output shaft by means of the pinions that mesh with both the ring and sun gears. The output shaft will rotate at a higher speed than the input shaft when the housing plates are prevented from rotating by the oil pump brake and the pinions rotate about their axes which are held stationary by the housing plates.

It is possible to cause the output shaft to rotate in a reverse movement by moving fingers into the spaces bounded by the ring and sun gears and by the planetary pinions, these fingers retarding and finally preventing the flow of oil between adjacent pinions as the fingers enter and finally fully occupy the spaces. The preventing of the free flow of oil between adjacent pinions by the fingers will cause the oil to stop the pinion rotation, whereby the pinions will rigidly connect the ring and sun gears together and establish a direct connection between the input and output shafts so that they both will rotate at the same speed.

A further object of my invention is to provide a transmission of the type described in which novel means can be actuated by the shifting lever for relieving any braking action being applied to the output shaft when the input shaft is not rotating and it is desired to move the vehicle in which the transmission is mounted. This means makes the oil pump brake of no effect on the transmission when the lever is manually moved in the direction of its length for a short distance to open the oil passage in the oil pump brake. Therefore a moving of the vehicle while the oil pump brake oil passage is open will cause the transmission to freely rotate the oil gears in the oil pump brake to move oil through the oil passage freely. The unobstructed oil passage will offer no braking action to the rotation of the oil gears and therefore no braking action will be applied to the output shaft.

A further object of my invention is to provide a transmission of the type described which is relatively simple in construction and is durable and efficient for the purpose intended.

Other objects and advantages will appear as the specification continues. The novel features of the invention will be set forth in the appended claims.

*Drawings*

For a better understanding of my invention, reference should be made to the accompanying drawings, forming part of this specification, in which:

FIGURE 2 is a transverse vertical section through the device and it is taken along the line 2—2 of FIGURE 1.

FIGURE 3 is a transverse vertical section through the planetary gearing mechanism and is taken along the line 3—3 of FIGURE 1 and is looking in the opposite direction from the section 2—2, taken along the same line.

FIGURE 4 is a transverse vertical section through the device and illustrates a front elevation of the shifting lever and is taken along the line 4—4 of FIGURE 1.

FIGURE 5 is a transverse vertical section through the oil pump brake and is taken along the line 5—5 of FIGURE 1.

Figure 1:
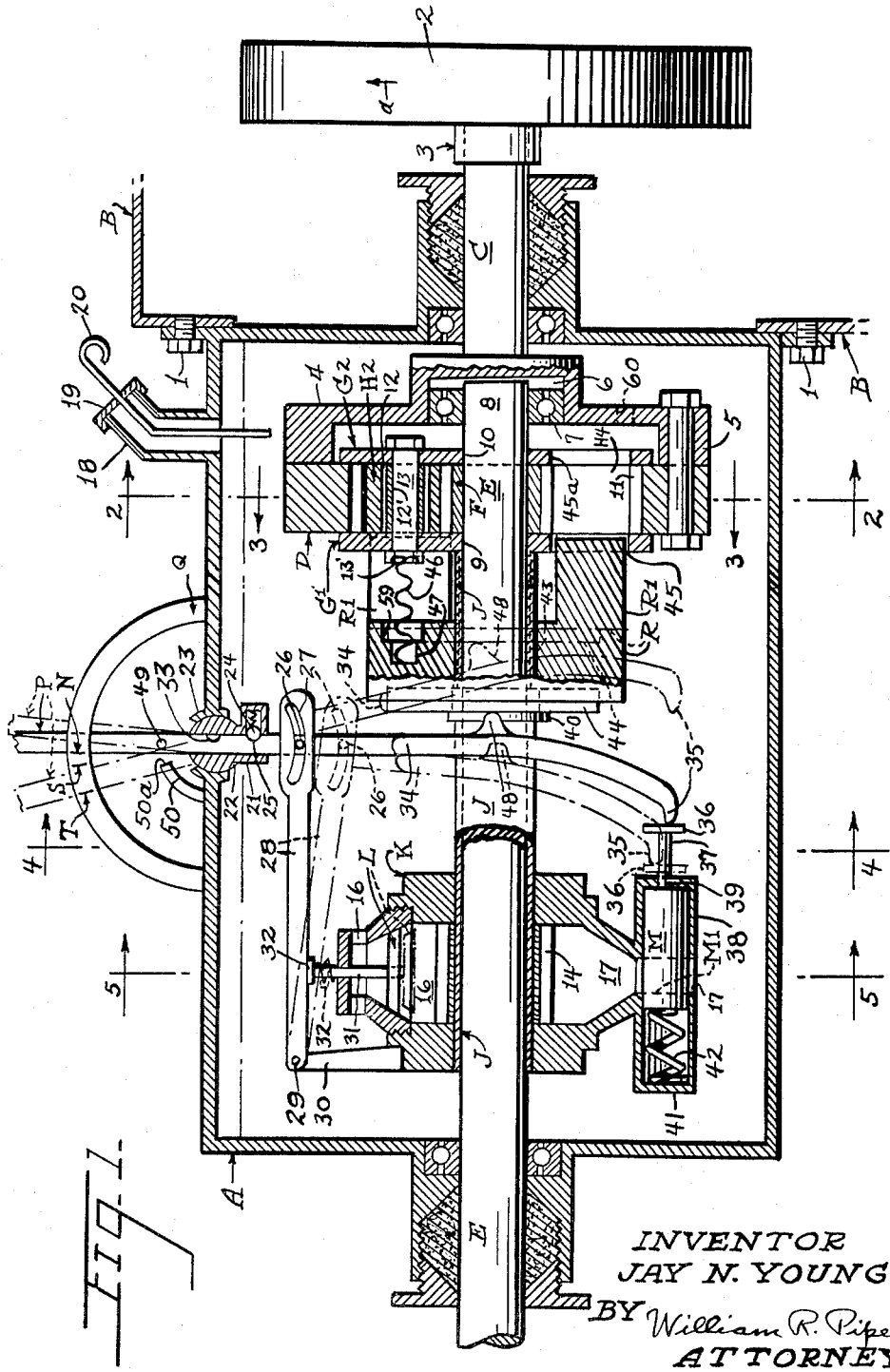
FIGURE 1 is a longitudinal vertical section through the device and it is taken substantially along the line 1—1 of FIGURE 5.

While I have shown only the preferred form of my invention, it should be understood that various changes, or modifications, may be made within the scope of the annexed claims without departing from the spirit thereof.

*Detailed description*

In carrying out my invention, I provide a housing A that is secured to an engine block B by cap screws 1 or other suitable fastening means. Any type of engine may be used and I have indicated a fly wheel 2 which is rotated by the engine and the input shaft C of my device is operatively connected to the fly wheel in any manner desired such as by a splined coupling 3.

The input shaft C is connected to a ring gear D by a disk-shaped member 4 that has an annular flange 5 integral therewith. The disk-shaped member 4 is provided with a recess 6 in which a ball bearing 7 is mounted. An output shaft E has its end 8 rotatably supported by the ball bearing 7.

A sun gear F is keyed to the output shaft E and is received between a pair of housing plates G1 and G2. FIGURE 1 shows the housing plates G1 and G2 as being in the form of disks that have central openings 9 and 10, respectively for receiving the output shaft E. The housing plates G1 and G2 are large enough in diameter so that their peripheries would extend beyond the teeth 11 of the ring gear D, see FIGURE 2. A plurality of pinions H1, H2 and H3 are rotatably carried by needle bearings 12 and these bearings are mounted on spacing sleeves 12' that in turn are mounted on the shanks of bolts 13. The bolts are inserted through aligned openings in the housing plates G1 and G2 and serve the additional function of securing the plates together. The needle bearings 12 and the spacing sleeves 12' permit the pinions H1, H2 and H3 to rotate freely while still being confined between the housing plates. The pinions mesh with the teeth 11 of the ring gear D and they also mesh with the sun gear F and they cooperate with these gears to provide a planetary transmission.

I provide means for retarding the rotation of the housing plates G1 and G2 and this comprises a tubular splined shaft J that is integral with the housing plate G1 and the axis of the shaft J coincides with the axis of the output shaft E. I have shown the inner diameter of the splined shaft J as being the same as the outer diameter of the output shaft E so that no space is provided between the two. It is possible for the splined shaft J to rotate freely on the output shaft E and its inner surface could be spaced from the shaft E. The splined portion of the shaft extends along a certain outer area of the shaft for a purpose presently to be described.

The retarding action may be applied to the splined shaft J and thence to the housing plates G1 and G2 and it consists of an oil pump brake indicated generally at K. The oil pump brake is mounted within the housing A and has one of its oil moving gears 14 keyed to the splined shaft J so that a rotation of the splined shaft will rotate the oil pump gear 14. A second oil moving gear 15, see FIGURE 5, is rotatably mounted in the casing of the oil pump brake K and it has teeth meshing with the teeth of the gear 14. An oil entrance passage 16, see FIGURES 4 and 5, is provided in the oil pump brake casing K and leads to the area where the two gears 14 and 15 mesh. An oil outlet passage 17 leads from the area where the two gears 14 and 15 mesh and has its outlet communicating with the interior of the housing A.

In actual practice, the parts thus far described from the input shaft C to the output shaft E are mounted within the housing A. This housing is filled with oil and it has an oil inlet pipe 18 at its top and this pipe is normally closed by a cap 19, see FIGURE 1. A dip stick 20 is carried by the cap 19 and it extends through the oil inlet pipe 18 and into the housing A an appreciable distance. The oil level in the housing A can be kept at a predetermined point and when the dip stick indicates that this level has dropped too low, additional oil may be added. All of the parts within the housing A are immersed in oil.

The oil entrance passage 16 in the casing for the oil pump brake K is placed below the oil level in the housing A and therefore the ortation of the gears 14 and 15 in the oil pump caused by the rotation of the splined shaft J will draw in oil through oil entrance passage 16 and will force this oil out through the outlet passage 17. The outlet passage 17, see FIGURES 1 and 5, has its outer end communicating with the interior of the housing A and therefore the oil will leave the passage 17 and will re-enter the housing.

I provide a spring-pressed pop valve L in the oil entrance passage 16 and this pop valve will permit oil to flow through the passage 16 to the gears 14 and 15, but will prevent a reverse flow of oil. In other words the spring-pressed pop valve L will act like a check valve and will permit oil to flow in only one direction along the oil entrance passage 16.

I further show a restricting piston M having a transverse opening M1 registering with the oil outlet passage 17 and this valve may be moved from full open position into closed position by a control lever P. When the valve M is fully opened, the oil pump brake will not retard the rotation of the splined shaft J. As the restricting valve M is gradually closed, the flow of oil through the oil outlet passage 17 will gradually be restricted more and more and this will gradually increase the retarding effect on the splined shaft J. When the restricting valve M is entirely closed, no more oil can flow through the passages 16 and 17 and the valve passage M1, and the oil gears 14 and 15 will be stopped from rotating. When the oil gear 14 stops rotating it will also stop further rotation of the splined shaft J and the splined shaft in turn will stop further rotation of the housing plates G1 and G2. The purpose of this will be described hereinafter.

I show the hand control level P slidably mounted in a sleeve 21, see FIGURE 1, and this sleeve has a spherical-shaped upper end 22 that in turn is received in a spherical socket 23 provided in the housing or casing A. The sleeve 21 carries a spring pressed ball 24 that is yieldingly received in a recess 25 provided in the lever P.

It will be seen from FIGURE 1 that the lever P has a pin 26 that is slidably received in an arcuate slot 27 provided in an actuating lever 28. The lever 28 has one end pivoted at 29 to an arm 30 which in turn is carried by the oil pump brake casing K. The spring-pressed pop valve L has its stem 31 provided with a head 32 and the actuating lever 28 bears against the head 32.

When the lever P is in neutral position N on a quadrant Q and the operator wishes to actuate the pop valve L for opening it, he merely presses downwardly on the lever P so as to slide the lever in the sleeve 21 until a second notch 33 in the lever will come into registration with the spring-pressed ball 24. This downward movement of the lever is sufficient to swing the actuating lever 28 downwardly and open the pop valve L. When this is done, the oil passage 16 will be opened so as to permit oil to flow therethrough. The purpose of this is to permit the operator to move the vehicle forwardly when the lever P is in neutral position. The forward movement of the vehicle will cause the splined shaft J to rotate and to rotate the gear 14. The rotation of the gear 14 will also rotate the gear 15 and move oil through passages 16 and 17. The opened check valve L will permit this movement. When the lever P is not moved downwardly so as to cause the notch 33 to receive the spring-biased ball 24, then the check or pop valve L will remain closed and no oil can flow through the passages 16 and 17.

The lever P is used for actuating the restricting valve or piston M. It will be seen from FIGURE 1 that the portion of the control lever P that extends below the pin 26 is formed into a yoke or loop-shaped portion 34, see FIGURE 4. This loop-shaped portion extends around the splined shaft J. At the lower end of the portion 34, I provide a projection 35 and this projection bears against a head 36 of a central pin 37 that is integral with the piston valve M and has its axis coinciding with the piston valve axis. The piston valve M is mounted in a cylinder 38, see FIGURE 1, and this cylinder has a central opening 39 through which the pin 37 slidably extends. The pin 37 has the head 36 formed on its outer end and the projection 35 on the lever P will contact this head for moving the piston M to the left in FIGURE 1 when it is desired to retard the flow of oil through the oil outlet passage 17. The cylinder 38 has a closed end 41 and a coiled spring 42 has one end bearing against the closed end 41 of the cylinder 38 and has its other end bearing against the piston M for yieldingly urging the piston to the right in FIGURE 1.

When the piston M is in the position shown in FIGURE 1, it will have its transverse opening M1 in registration with the outlet oil passage 17. Therefore oil can flow through the passage 17 when the gears 14 and 15 are rotated. When, however, the shifting lever P is moved from neutral position N and is swung to the right in FIGURE 1, the projection 35 at the lower end of the lever will be moved to the left and will cause the piston valve M to move to the left. The movement of the piston valve will gradually cut off the flow of oil through the passage 17 and this will gradually increase the braking action of the oil pump brake on the gears 14 and 15. A slowing down of the rotation of the gears will, of course, slow down the rotation of the splined shaft J. This will slow down the rotation of the housing plates G1 and G2.

*Neutral position*

When the fly wheel 2 is rotated in the direction shown by the arrow in FIGURE 1, the input shaft C will also be rotated in the same direction and this will cause the ring gear D to rotate in a counter-clockwise direction when looking at FIGURE 2. When the lever P is in neutral position, a rotation of the ring gear D in a counter-clockwise direction will rotate the pinions H1, H2 and H3 counter-clockwise and the pinions in turn will mesh with the sun gear F which is held stationary by the shaft E. The pinions will rotate about the sun gear F so as to rotate the housing plates G1 and G2 in a counter-clockwise direction. The housing plate G1 will rotate the splined shaft J in a counter-clockwise direction. The device is now functioning in neutral position with the engine, not shown, operating.

*Forward position*

When a braking action is applied to the splined shaft J by the movement of the lever P to the right in FIGURE 1, and the gradual closing of the valve M to restrict the flow of oil through the passage 17, the rotation of the splined shaft J will be slowed down. As the rotation of the shaft J becomes slower, the rotating ring gear D in a counter-clockwise direction and a rotation of the pinions H1, H2 and H3 in a counter-clockwise direction will start to impart a rotation to the sun gear F as the splined shaft J reduces the speed of rotation of the housing plates G1, G2 in a counter-clockwise direction.

It will be seen that as the speed of the splined shaft J is slowed down until it comes to a full stop because the movement of the piston valve M is such as to cut off the flow of oil through the passage 17, then all of the counter-clockwise rotation of the ring gear D which is applied to the rotation of the pinions H1, H2 and H3 will cause these pinions to rotate the sun gear F and output shaft E in a clockwise direction when looking at FIGURE 2. The axes of the pinions will be held against rotation about the axis of the output shaft E because of the braking action of the brake pump K when the oil outlet passage 17 is fully closed. The forward speed of the vehicle now depends upon the amount of power delivered by the engine, not shown, and the weight of the vehicle and the load carried by the vehicle.

*Retard position*

I show a means for retarding the forward movement of the vehicle when the operator wishes to slow down the speed of the vehicle. In FIGURE 1, I show a reverse restricting body R that is splined to the outer surface of the splined shaft J at 43 so that a rotation of the splined shaft will rotate the body R. However, the body R can be moved longitudinally along the splined shaft while still being rotated by the shaft. I provide a thrust roller bearing indicated generally at 44 and this bearing is mounted on the reverse restricting body R. A snap ring 40 is mounted on the splinted shaft J and prevents movement of the reverse restricting body R to the left in FIGURE 1, from the full line position of this body. The thrust bearing is carried by the reverse restricting body and its inside diameter does not touch the splined shaft. The snap ring acts against the thrust bearing when the reverse restricting body is all the way to the left in FIGURE 1.

The body R is provided with three integral fingers R1 that extend in a longitudinal direction from the body. These fingers are slidably received in three openings 45 in the housing plate G1 and can be moved into aligned openings 45a in the housing plate G2. Coil springs 46 have one of their ends received in recesses 47 provided in the reverse restricting body R and the other ends of the springs are received in recesses 13' provided in the heads of the bolts 13. The springs 46 yieldingly urge the reverse restricting body R to the left in FIGURE 1 and maintain the outer surface of the thrust bearing 44 in contact with the snap ring 40, that is mounted on the shaft J.

It is possible for the operator to swing the lever P from neutral position N toward the retard position, indicated at S on the quadrant Q. A pin 49 on the lever P will contact with the end of a pin block 50, carried by the housing A and will prevent the operator from accidentally moving the shift lever P beyond the retard position and into reverse position.

The movement of the shifting lever P to the left into retard position S, will cause two projections 48 on the yoke 34 to move the thrust bearing 44 to the right in FIGURE 1 and to also move the reverse restricting body R to the right along the splined portion 43 on the shaft J. This will cause the end of the fingers R1 to enter the spaces H4 which are provided between the adjacent pinions H1, H2 and H3, see FIGURES 1, 2 and 3. As the fingers R1 enter the spaces H4 between the pinions H1, H2 and H3, they will interfere with the flow of oil which is being moved from pinion to pinion and through the spaces H4 by the rotation of the pinions.

The forward movement of the vehicle is caused by the counter-clockwise rotation of the ring gear D in FIGURE 2 and the counter-clockwise rotation of the pinions H1, H2 and H3, about their own axes plus the clockwise rotation of the sun gear F and the output shaft E. The housing plates G1 and G2 hold the pinion axes from rotating about the axis of the sun gear F when the transmission is operating in forward position. The counter-clockwise rotation of the pinion H2 and its teeth meshing with the teeth 11 of the counter-clockwise rotating ring gear D in FIGURE 2 will cause oil to be squeezed out from between the meshing teeth and this oil will move in the direction of the arrow *b* in FIGURE 2. Also in the same figure, the counter-clockwise rotation of the pinion H3 and the counter-clockwise rotation of the ring gear D will provide an opening area as the meshing teeth leave each other and the oil in the space H4 can enter this area as indicated by the arrow *c* in FIGURE 2.

If now one of the fingers R1 enters the space H4 provided between the pinions H2 and H3, then this finger will interfere with the free flow of oil from the arrow *b* to the arrow *c*. Such an interference will retard the flow of oil between the pinions and will tend to slow up the rotation of the pinions. As soon as this takes place, the pinions will tend to directly connect the ring gear D to the sun gear F and this will cause the sun gear to start to slow up in its clockwise rotation and therefore the output shaft E will start to slow up in its clockwise rotation.

The driver permits the vehicle engine, not shown, to idle when he moves the lever P into retard position. Therefore, the tendency of the vehicle to move forwardly under its own momentum will cause the output shaft E to now become the source of power and it will try to continue rotating the sun gear F in a clockwise direction. Since the fingers R1 when moved into their retarding positions in the spaces H4 between the pinions will slow up the flow of oil between the pinions, and since this will tend to connect the sun gear F directly to the ring gear D and also tend to rotate the housing plates G1 and G2 with the sun gear, the tendency of the sun gear to rotate clockwise will cause the housing plate G1 to tend to rotate the splined shaft J and pump gear 14, clockwise in FIGURE 5. The gear 14 and the meshing gear 15 will tend to force the oil into the passage 16. The pop valve L will close and prevent this oil flow. Therefore, the gear 14 cannot rotate in a clockwise direction and neither can the splined shaft J. Therefore, the housing plate G1 cannot rotate clockwise and a braking action will be applied to the sun gear to stop it from rotating clockwise.

*Reverse position*

It is possible to move the shift lever P into a reverse position indicated at T on the quadrant Q in FIGURE 1. The vehicle is preferably brought to a complete stop before the lever P is moved into reverse position. In FIGURE 1, I show the pin 49 on the shift lever P placed in a position where it will abut the end 50a of the pin block 50 when the lever P is moved into retard position. The pin block 50 will prevent the accidental movement of the shift lever P into full reverse position. When the lever P is in retard position, the three fingers R1 will only partially enter the spaces H4 provided between the pinions H1, H2 and H3. It is only possible for the operator to move the lever P into reverse position after he first moves the lever downwardly in the sleeve 21 to move the pin 49 out of contact with the end 50a of the pin block. When this is done, the lever P can be moved counter-clockwise in FIGURE 1 to cause the mechanism to be shifted into reverse position.

I have shown the yoke 34 of the lever P moved into full reverse position by the swinging of the lever in FIGURE 1. The projections 48 on the yoke will contact with the thrust bearing 44 and will move this bearing to the right in FIGURE 1 and cause the reverse restricting body R to move into the dot-dash line position in this figure. The movement of the body will cause its three fingers R1 to enter the three spaces H4 and also enter the openings 45a in the housing plate G2 to block the free flow of oil between the pinions H1, H2 and H3. The three fingers R1 will now fill the spaces H4.

In FIGURE 3, I show an end view of the three fingers

R1 in order to illustrate how these fingers are shaped so as to retard the flow of oil between the three pinions. Since FIGURE 3 shows the end view of the fingers R1, the ring gear D will be rotating in a clockwise direction in this figure in order to correspond with the counter-clockwise direction of the ring gear in FIGURE 2. The three pinions H1, H2 and H3 will also appear to be rotating in a clockwise direction which corresponds to the counter-clockwise direction rotation in FIGURE 2.

Each finger R1 has an arcuate surface 51 that is placed close to each pinion, see FIGURE 3. The same finger also has an outer arcuate surface 52 that is placed close to the teeth 11 on the ring gear D. Therefore, the tendency for the oil to be ejected from between the meshing teeth of the pinion H2 and the ring gear D as indicated by the arrow b in FIGURE 3, this oil will strike against the arcuate surface 51 at point b and the surface will act as a block and prevent this oil from being squeezed out from between the gears. As soon as the oil is blocked, it will be stopped from flowing and this will stop rotation of the pinion H2. When this occurs, the pinion H2 will act as a rigid connection between the ring gear D and the sun gear F. The other pinions H1 and H3 are blocked from rotating in the same manner.

However, before a complete locking takes place between the gears D, F and the pinions, the fingers R1 will be gradually moved into the recesses H4 and the locking action of the pinions on the gears D and F will be gradual. When the pinions are prevented from rotating, they will cause the planetary gearing consisting of the gears D and F and pinions H1, H2 and H3 to rotate as a unit. In FIGURE 3, the clockwise rotation of the ring gear D will cause a clockwise rotation of the sun gear F. This same rotation is shown to be counter-clockwise in FIGURE 2 and therefore the sun gear F will be rotating in a direction opposite to that taken when it is moving the vehicle forwardly. A locking of the pinions to the ring gear and to the sun gear by the full insertion of the fingers R1 into the recesses H4, will directly connect the input shaft C to the output shaft E. Therefore, in reverse position the output shaft E will be directly connected to the input shaft C and the shaft E will be rotating at about one third the speed it rotates when the vehicle is moving forward.

Again referring to FIGURE 3, it will be seen that each finger R1 has a longitudinal recess 53 which is placed at the juncture of the arcuate surface 51 with the arcuate surface 54, this latter surface being spaced a slight distance away from the teeth on the sun gear F. Also the finger is provided with a convex longitudinally extending surface 55 that connects with the outer cylindrical surface 52 on the finger and with an arcuate surface 56, this latter surface being placed adjacent to the teeth on the pinion H3.

Both the recess 53 and the convex surface 55 provide intake areas 57 and 58 respectively in which oil can be supplied to the meshing teeth of the gears. This will prevent the meshing teeth from having a tendency to pull the oil apart because of the fact that not sufficient oil would be supplied to the gears.

After the device has remained in reverse gear for the desired length of time, the operator can return the shifting lever P to neutral position. In certain instances it may be desirable to move the vehicle when the engine is not operating or in case something should take place that the engine is incapable of operating. I provide novel means for opening the check valve L to permit the vehicle to be moved forwardly. In FIGURE 1, I show the shifting lever P provided with the second notch 33. The lever P can be moved downwardly in the sleeve 21 to bring the second notch 33 into a position to receive the spring-pressed ball 24. The downward movement of the lever P into its new position will cause the pin 26 to rock the lever 28 downwardly and to move the valve stem 31 to open the valve L. This will open the passage 16 and permit the flow of oil through the passage caused by the rotation of the oil gear 14 when the vehicle, not shown, is moved forwardly. This feature has already been mentioned.

The body of the reverse restricting member R, has recesses 59 for receiving the heads of the bolts 13 when the member R is moved to the right in FIGURE 1 to shift the transmission into reverse position. The disc-shaped member 4 has openings 60 therein for the free passage of oil therethrough. The oil pump brake K is supported within the housing A by any means, none being shown. The oil level in the housing A is sufficient to keep the transmission and the oil pump brake K submerged at all times. The moving parts will therefore have sufficient lubrication.

The splined shaft J may have its inner diameter larger than the diameter of the output shaft E and in this case a bushing, not shown, would be mounted on the output shaft and rotatably support the splined shaft and pinion gear cage including the housing plates G1 and G2.

I claim:
1. An infinitely variable planetary transmission comprising:
(a) a transmission housing containing a fluid;
(b) a drive shaft extending into said housing;
(c) a ring gear in the housing and rotated by said drive shaft;
(d) a driven shaft extending into said housing and having its axis aligned with the drive shaft axis and with the axis of said ring gear;
(e) a sun gear mounted on said driven shaft and keyed thereto;
(f) planetary housing plates rotatable about said driven shaft and having their outer peripheral edges enclosing the ends of the teeth on said ring gear;
(g) a plurality of spaced pinions rotatably carried by said housing plates and meshing with said ring and sun gears;
(h) a hollow shaft enclosing a portion of said driven shaft and being connected at one end to one of said housing plates so as to rotate therewith;
(i) a fluid brake pump disposed in said transmission housing and having fluid inlet and outlet passages in communication with the fluid in said housing;
(j) said fluid brake pump rotatably receiving said hollow shaft and having a fluid moving gear keyed to said hollow shaft and disposed in the fluid inlet and outlet passages;
(k) a spring-biased pop valve for closing the fluid inlet passage; said valve being opened by the flow of fluid into the inlet passage;
(l) a manually controlled valve for controlling the flow of fluid through said fluid outlet passage; and
(m) a lever for moving the manually controlled valve into closed position;
(n) said manually controlled valve as it is gradually closed by the movement of said lever initially retarding the flow of fluid moved by the rotating fluid moving gear so as to retard the rotation of said gear and finally stop rotation of the fluid moving gear when said manually controlled valve is fully closed; whereby
(o) said hollow shaft is gradually brought to a stop and will bring its connected housing plate to a stop;
(p) said planetary gears in being rotated by the rotation of the ring gear and the drive shaft, imparting rotation to said sun gear and driven shaft as the slowing up and final stopping of the housing plate gradually brings the movement of the planetary gears about the driven shaft to a stop and the rotation of the planetary gears about their stationary axes will impart rotation to the sun gear and driven shaft.

2. The combination as set forth in claim 1; and in which
(a) a pivoted arm for opening said pop valve when said arm is swung about its pivot; and
(b) means connecting said lever to said arm;
(c) said lever being mounted so that it can be moved in the direction of its length; whereby
(d) a movement of said lever in the direction of its length will actuate the arm for opening said pop valve.

3. The combination as set forth in claim 1; and in which
(a) said housing plates have aligned openings that communicate with the spaces between adjacent pinions;
(b) a member slidably mounted on said hollow shaft and splined thereto so as to rotate therewith; said member being disposed adjacent to one of said housing plates;
(c) said member having longitudinally extending fingers adapted to enter the openings in said housing plates and to enter the spaces between adjacent pinions so as to interfere with the free flow of fluid between the rotating pinions when said member is moved along the hollow shaft and toward said housing plates;
(d) said member being moved toward said housing plates when said lever is swung in a predetermined direction, the moving member causing said fingers to partially enter the spaces between adjacent pinions to interfere with the free flow of liquid between the rotating pinions and thereby slow up the rotation of said pinions; and
(e) a stop for preventing further swinging of said lever when said fingers partially fill the spaces between adjacent pinions.

4. The combination as set forth in claim 3; and in which
(a) said lever having a projection thereon that contacts said stop when said fingers partially fill the spaces between adjacent pinions;
(b) said lever being mounted so that it can be moved in the direction of its length for freeing the projection from said stop; whereby
(c) said lever can be swung further for moving said member and causing said fingers to fill the spaces between adjacent pinions and stop the flow of fluid therebetween and thereby prevent said pinions from rotating and causing the pinions to connect the ring and sun gears together so that they will rotate as a unit.

5. In an infinitely variable planetary transmission:
(a) a transmission housing containing a fluid;
(b) a ring gear mounted in said housing and submerged in the fluid; said gear being rotatable about its axis;
(c) a sun gear mounted within said ring gear and being rotatable about an axis that coincides with said ring gear axis;
(d) a pair of housing plates disposed on each side of said ring gear and being rotatable about a common axis that coincides with the ring gear axis;
(e) shafts interconnecting said housing plates and having planetary pinions rotatably mounted thereon and disposed between said plates; said planetary pinions meshing with said ring and sun gears; the axes of said planetary pinions being parallel to the axis of the sun and ring gears;
(f) a splined shaft having an end connected to one of said housing plates and having its splined portion on the outer cylindrical surface of said shaft; the axis of the splined shaft coinciding with the axis of the sun and ring gears;
(g) a body member having a splined bore for slidably receiving the splined portion of said splined shaft so as to be movable along said shaft while being rotatable with said shaft; and
(h) said body member having longitudinally extending fingers that parallel the axis of the splined shaft;
(i) said housing plates having aligned openings therein for receiving said fingers when said body member is moved toward said plates;
(j) said housing plate openings being arranged so as to permit said fingers to enter the spaces between said plates and to occupy the areas between adjacent planetary pinions;
(k) whereby as said body moves said fingers into the spaces between adjacent planetary pinions, the flow of fluid between adjacent planetary pinions caused by their rotation will be impeded and will tend to act as a braking action for slowing down the rotation of said planetary pinions.

6. The combination of elements as set forth in claim 5; and in which
(a) said fingers having a cross sectional area and shape that substantially is the same as the contour of the spaces lying between adjacent planetary pinions;
(b) each finger having arcuate inner and outer peripheral portions that are disposed close to the sun and ring gear teeth respectively; and having other arcuate peripheral portions that are disposed close to the adjacent planetary pinions;
(c) each finger also having a recess disposed adjacent to where the sun gear and each planetary pinion meshes for providing a fluid intake area where fluid can be supplied to the meshing teeth that are moving in a direction to remove fluid from said intake area;
(d) each finger also having a convex portion for providing another fluid intake area between the teeth of the ring gear and the teeth of the planetary pinion where fluid can be supplied to these meshing teeth that are moving in a direction to remove fluid from said another fluid intake area.

7. An infinitely variable planetary transmission comprising:
(a) a transmission housing containing a fluid;
(b) a drive shaft extending into said housing and being rotatable in a clockwise direction;
(c) a ring gear in said housing and rotated by said drive shaft;
(d) a driven shaft extending into said housing and having its axis aligned with the drive shaft axis and with the axis of said ring gear;
(e) a sun gear mounted on said driven shaft and keyed thereto;
(f) planetary gears interconnecting said ring gear with said sun gear and being rotatable about said sun gear in a clockwise direction when said sun gear is prevented from rotating;
(g) a fluid brake pump disposed in said housing and submerged in the housing fluid; said brake having a fluid-conveying passage therein and a fluid-moving gear disposed in the passage for drawing in fluid through the inlet end of said passage when the gear is rotated clockwise and for forcing the fluid in the passage through the outlet end of said passage;
(h) operative connection between said planetary gears and said brake pump gear for rotating said brake pump gear clockwise when said planetary gears are rotated clockwise about said sun gear when said sun gear and said driven shaft are prevented from rotating;
(i) a throttle valve placed in the outlet end of the fluid passage in said brake pump;
(j) a lever for actuating said throttle valve for gradually closing the fluid passage in said brake pump for gradually restricting the flow of fluid through said fluid passage and for gradually bringing said fluid-moving gear in said pump to a stop;
(k) whereby the gradual stopping of the rotation of said fluid-moving gear will gradually stop the rotation of said planetary gears about said sun gear and said planetary gears will therefore gradually impart rotation to said sun gear and said driven shaft in a counterclockwise direction;
(l) a spring-biased pop valve for closing the fluid inlet passage; said valve being opened by the flow of fluid into the inlet passage; and
(m) means operatively connecting said pop valve to said lever so that when said lever is moved in a predetermined manner it will open said pop valve.

References Cited by the Examiner
FOREIGN PATENTS
1,018,963   9/1952   France.

DAVID J. WILLIAMOWSKY, *Primary Examiner.*
DON A. WAITE, *Examiner.*
J. R. BENEFIEL, *Assistant Examiner.*